(12) United States Patent
Stapleton et al.

(10) Patent No.: US 7,941,668 B2
(45) Date of Patent: May 10, 2011

(54) METHOD AND SYSTEM FOR SECURELY MANAGING APPLICATION TRANSACTIONS USING CRYPTOGRAPHIC TECHNIQUES

(76) Inventors: Jeff J. Stapleton, Helotes, TX (US);
Bradley L. Morrison, Boerne, TX (US);
Arnold G. Werschky, Colorado Springs, CO (US)

( * ) Notice: Subject to any disclaimer, the term of this patent is extended or adjusted under 35 U.S.C. 154(b) by 1338 days.

(21) Appl. No.: 11/483,915

(22) Filed: Jul. 10, 2006

(65) Prior Publication Data

US 2007/0011459 A1    Jan. 11, 2007

Related U.S. Application Data

(60) Provisional application No. 60/595,481, filed on Jul. 8, 2005.

(51) Int. Cl.
*H04L 9/32* (2006.01)
(52) U.S. Cl. ............... 713/178; 705/64; 709/236
(58) Field of Classification Search ............ 713/178; 705/64; 709/236
See application file for complete search history.

(56) References Cited

U.S. PATENT DOCUMENTS

| | | | |
|---|---|---|---|
| 4,649,233 A | 3/1987 | Bass | |
| 5,204,961 A | 4/1993 | Barlow | |
| 5,228,083 A | 7/1993 | Lozowick | |
| 5,355,474 A | 10/1994 | Thuraisngham | |
| 5,416,842 A | 5/1995 | Aziz | |
| 5,491,750 A | 2/1996 | Bellare et al. | |
| 5,511,122 A | 4/1996 | Atkinson | |
| 5,548,721 A | 8/1996 | Denslow | |
| 5,577,209 A | 11/1996 | Boyle et al. | |
| 5,590,199 A | 12/1996 | Krajewski, Jr. et al. | |
| 5,604,803 A | 2/1997 | Aziz | |
| 5,606,609 A | 2/1997 | Houser | |
| 5,615,268 A | 3/1997 | Bisbee | |
| 5,619,657 A | 4/1997 | Sudama | |
| 5,768,381 A | 6/1998 | Hawthorne | |
| 5,768,504 A | 6/1998 | Kells | |
| 5,802,178 A | 9/1998 | Holden et al. | |
| 5,826,014 A | 10/1998 | Coley | |
| 5,864,843 A | 1/1999 | Carino | |
| 5,926,636 A * | 7/1999 | Lam et al. ............... 719/313 |
| 6,002,772 A | 12/1999 | Saito | |
| 6,047,072 A | 4/2000 | Field et al. | |
| 6,073,242 A | 6/2000 | Hardy et al. | |
| 6,085,322 A | 7/2000 | Romney | |
| 6,134,327 A | 10/2000 | Van Oorschot | |
| 6,141,753 A | 10/2000 | Zhao | |
| 6,161,139 A | 12/2000 | Win | |
| 6,198,824 B1 | 3/2001 | Shambroom | |
| 6,212,636 B1 | 4/2001 | Boyle | |
| 6,275,939 B1 | 8/2001 | Garrison | |
| 6,275,941 B1 | 8/2001 | Saito et al. | |
| 6,304,974 B1 | 10/2001 | Samar | |
| 6,389,589 B1 | 5/2002 | Mishra | |
| 6,408,336 B1 | 6/2002 | Schneider | |
| 6,668,322 B1 | 12/2003 | Wood | |
| 6,691,232 B1 | 2/2004 | Wood | |
| 6,735,701 B1 | 5/2004 | Jacobson | |
| 6,792,545 B2 | 9/2004 | McCreight | |

(Continued)

*Primary Examiner* — Thanhnga B Truong

(57) ABSTRACT

A method and system for secure managing transactions between application devices over a network. The present invention provides a method and system for receiving data from an application device, such as computer workstation, ATM, credit card point-of-sale terminal, or application software, and transferring that data securely over a network to a recipient application device. The method and system provide secure cryptographic key and enterprise management of embedded, standalone and tightly coupled information assurance components.

13 Claims, 3 Drawing Sheets

U.S. PATENT DOCUMENTS

| | | |
|---|---|---|
| 6,816,905 B1 | 11/2004 | Sheets et al. |
| 6,839,744 B1 | 1/2005 | Kloba |
| 6,892,307 B1 | 5/2005 | Wood |
| 7,774,402 B2 * | 8/2010 | Singh et al. .................. 709/201 |
| 2002/0057803 A1 | 5/2002 | Loos |
| 2002/0071560 A1 | 6/2002 | Kurn et al. |
| 2002/0071561 A1 | 6/2002 | Kurn et al. |
| 2002/0071564 A1 | 6/2002 | Kurn et al. |
| 2002/0071565 A1 | 6/2002 | Kurn |
| 2002/0071567 A1 | 6/2002 | Kurn et al. |
| 2002/0080975 A1 | 6/2002 | Rich et al. |
| 2002/0091815 A1 | 7/2002 | Anderson |
| 2002/0091824 A1 | 7/2002 | Anderson et al. |
| 2002/0091944 A1 | 7/2002 | Anderson |
| 2003/0065623 A1 * | 4/2003 | Corneil et al. .................. 705/64 |
| 2005/0102509 A1 | 5/2005 | Fascenda |

* cited by examiner

METHOD AND SYSTEM FOR SECURELY MANAGING APPLICATION TRANSACTIONS USING CRYPTOGRAPHIC TECHNIQUES

REFERENCE TO A RELATED APPLICATION

This is a non-provisional utility application claiming the benefit of U.S. provisional application Ser. No. 60/595,481, filed on Jul. 8, 2005, which is incorporated by reference herein.

BACKGROUND OF THE INVENTION

1. Field of the Invention

The invention relates to an enterprise management system for use in transporting application data between application devices over a network. More specifically, the present invention provides a method and system for securely managing an application device across a network.

2. Background of the Invention

Modern computer connectivity owes much to the increasing importance and cost of computers during the 1960s and 70s. Researchers questioned how two or more computers could be connected and their resources shared between users located at remote and different geographical points. Because the bandwidth needs of these dispersed users were intermittent—that is, short periods of high activity were interspersed between longer periods of little or no activity—researchers began developing the idea of a packet-switching methodology as an alternative to the relatively inefficient circuit-switching methodology of telephone circuits. During the 1970s, the foundation of modern networking was laid by the development of an architecture for connecting various networks together, embodied in the earliest forms of Transmission Control Protocol (TCP). The three key Internet protocols—TCP, Internet Protocol (IP), and User Datagram Protocol (UDP)—were conceived during this period.

The next two decades saw prolific growth in the number of networks, at least partly because of the Department of Defense's (DoD) and universities' efforts to interconnect their networks. Email and file transfer became more important to the communication of research and development among scholars. As interest in access to supercomputers became heightened, networks were developed to allow access to supercomputing centers.

The 1990s saw the most prolific growth in networking as the previous focus on scholarly and military use of networks turned instead to commercial use and the World Wide Web. Researchers made significant advances in routers and other routing technology. These developments have culminated in an increased presence of networks in all aspects of life, including such areas as financial transactions (e.g., automated teller machines and credit card verification systems), military and government applications (e.g., maintenance and control of power grids), and entertainment (e.g., video on demand).

The development of methods and systems for securely transferring data through these networks, however, has been largely out-paced by the development of the networks and the sophistication of the application devices themselves. This has left many application devices—the actual devices, whether software or hardware, that use the information delivered through the network—vulnerable to compromised network requests (integrity), counterfeited network requests (authenticity), or unauthorized network requests (authorization). In other words, information moving through a network to an application device could be tampered with while in transit, could be faked, or could be sent from a source not authorized to make such a request. Moreover, the transferred information might be replicated and then used elsewhere, raising confidentiality concerns. These risks are very real and occur on a daily basis, amounting to hundreds of millions of dollars in yearly fraud losses.

Present methods for securely transferring data between application devices address these integrity, authenticity, authorization, and confidentiality components 1) do not adequately combine these elements to provide a secure, comprehensive network-centric capability for management of these components, and 2) are narrow in scope to an application-specific implementation. For example, encryption has long been used to keep information confidential during transport. Federal Information Processing Standards (FIPS) Publication (PUB) 198 specifies an algorithm for applications requiring message authentication using a symmetric-based keyed message authentication code (HMAC). The HMAC is used to authenticate both the source of a message and its integrity, but does not address authorization or confidentiality, and does not provide controls provable to a third party.

Similarly, digital signatures, such as those defined in FIPS PUB 186, may be used to authenticate a message, but do not provide confidentiality or provable data integrity without some other element, such as a trusted time stamp (e.g., American National Standard X9.95-2005 Trusted Time Stamp, developed by Accredited Standards Committee X9, Inc.). By combing a trusted time stamp with a digital signature, thereby removing the time stamp from the control of the content provider, a digitally signed message cannot be back-dated without such back-dating being detected.

Current network management protocols, such as Simple Network Management Protocol (SNMP), may provide some low level security and rudimentary network management capability, but are not sufficiently sophisticated to provide the necessary security management combined with flexible application device management capability. Thus, a need exists for a method of utilizing cryptographic elements—namely, encryption, authenticity, and data integrity—to yield true non-repudiation, meaning that these cryptographic elements are all provable to a third party. The prior art fails to provide this secure, comprehensive, network-centric capability for localized or remote management of Information Assurance Components that includes such things as application devices, cryptographic devices, application subsystems, cryptographic subsystems and other network appliances used by commercial industry and the government.

SUMMARY OF THE INVENTION

The present invention addresses the deficiencies of the prior art by providing a method and system for securely managing application transactions using cryptographic techniques to provide data integrity, entity authentication, and data confidentiality. The present invention fulfills a need to securely manage these Information Assurance Components (IACs) within an information technology enterprise at the application level using a canonical message format and protocol that addresses such areas as Cryptographic Key Management, Configuration Management, Policy Management, Authority Management, Inventory Management and Audit Management.

The present invention uses a canonical transaction formation, protocol and processing model to manage enterprise devices in a secure fashion using standard cryptographic mechanisms to provide data integrity, entity authentication and data encryption. Moreover, the present invention can accommodate other message formats (e.g., Simple Network Management Protocol, or SNMP) by encapsulating the alien message in the canonical format and securing it via the standard cryptography mechanisms. The invention provides for utilizing these cryptographic elements to yield true non-repudiation, meaning that these are all provable to a third party This same approach can aide those IACs that are network enabled and are therefore difficult to remotely manage, inventory, and rekey. In addition, the present invention provides a method of connecting legacy End Cryptographic Units to a management system, and can encode and translate its transaction formation using Abstract Syntax Notation One (ASN.1) or Extended Markup Language (XML).

The method and system of the present invention comprise the formatting of data into one or more trusted transactions. Each trusted transaction comprises a transaction and an Integrity object, which is more specifically a trusted time stamp. A transaction comprises a header, a data package logically following the header—which is the data ultimately delivered/received to/from an application device—and a trailer logically following the data package. The transaction data package is either unencrypted plaintext or encrypted ciphertext, but not both.

According to the preferred embodiment, the transaction header is composed of a transaction code, a transaction number, and a transaction route. The transaction trailer may be one or both of security objects defined as an Identity object and an Encryption object, although each of these is optional. The Identity object, which is optional, is a SignedData object as defined in either the X9.73 or X9.96 Cryptographic Message Syntax (CMS) standards, with detached data. The digital signature is on the plaintext transaction data package and generated by the sender. The Encryption object, which is also optional, is an EnvelopedData object as defined by one of X9.73 or X9.96 CMS with detached data. The encryption is on the plaintext transaction data package, which produces the ciphertext.

According to the preferred embodiment of the invention, the Integrity object is a Time Stamp Token (TST) as defined in American National Standard X9.95-2005 Trusted Time Stamp, which contains either a hash of the Transaction object or a digital signature of the Transaction object, thus providing content integrity linking to a provable point in time. The integrity object is mandatory and present on all transactions.

The selection of the transaction code and the value of the transaction number in the header, selection of the security methods for the identity and encryption objects in the trailer, and the selection of the method used for the trusted time stamp in the Integrity object are related to the application requirements; and are referred to herein as predetermined management parameters.

The method is applied and the system placed between an application device and a network, wherein the application device is a generic device composed of application software (e.g., a database management system) or hardware (e.g., a credit card point-of-sale terminal, an automated teller machine, a cell phone). In other words, the application device is a general term for any device that may be communicated with over a network. Similarly, the network may be any combination of elements for receiving information and routing that information through switches, routers, and the like to another application device, including a local area network (LAN), the Internet, a wireless network, or any combination of subnetworks.

When a foreign data package is received from an application device into the system of the present invention, the present invention generates a trusted transaction comprising that data package and presents the trusted transaction to the network for delivery to a recipient application device. The data package is received by a unit interface driver, which, if necessary, provides the data package to a unit translator process for translation into a canonical format, which is a format native to the enterprise management system. The data package is provided to a unit interface process, either from the unit interface driver (if no translation was necessary) or from the unit translator process (if translation was necessary), which unit interface process generates a trusted transaction comprising a header, the received data package, a trailer including an integrity object comprising a trusted time stamp and optionally one or both of an identity object and an encryption object. This trusted transaction is written to data storage for transfer to a network interface process, which routes the trusted transaction either directly to a network interface driver for presentation to the network or to the network interface driver through a network translator process for conversion into a network-compatible format.

Inbound trusted transactions are received from the network and the data package ultimately extracted therefrom for delivery to the recipient application device. An inbound trusted transaction is received from the network by the network interface driver, and either routed directly or through the network translator process for conversion into canonical format, depending on the format of the inbound trusted transaction. The network interface process validates the inbound trusted transaction, after which the data package thereof is provided to the unit interface driver or, if necessary, to the unit translator process for translation from a canonical format into a format compatible with the application device.

Another feature of the invention provides for administering, or "locking down," an audit log for each generated trusted transaction, each validated trusted transaction, and any processing errors such as undelivered messages, alarm events, and late delivered requests or responses. As a trusted transaction is generated or validated, an audit post process generates an audit record, which is itself a trusted transaction wherein the data package of the audit record is the generated or validated trusted transaction. The generated audit record is then added to an audit log, which is also a trusted transaction. After the addition, the audit log is recreated as a new trusted transaction and recorded to storage. Moreover, the invention provides for responding to inbound trusted transactions that request a specific audit record of the audit log, or the audit log itself.

Another feature of the invention provides for generating an audit alarm as a trusted transaction for predetermined alarm events. Each generated audit alarm is captured as an audit record sent as a trusted transaction to a remote application device across the network according to predetermined audit management parameters. Audit alarm events are predetermined in audit management parameters based on the application and hardware characteristics of the unit process (e.g., an application processing error, a low battery condition, an ATM running out of cash, tamper detection). Such predetermined audit management parameters establish which application events generate an audit record and which application events initiate an audit alarm.

All audit alarms are captured as audit records. For example, an application subsystem that detects a low battery event can generate an audit record and generate an audit alarm. Further, an application subsystem can detect a low cash stack for an ATM, or a hardware security subsystem can detect a tamper event, both of which can generate an audit record and audit alarm; but, for example, the successfully completion of a file transfer may only generate an audit record and not an audit alarm.

According to still another feature of the present invention, an audit record is created for an undelivered trusted transaction, which is a trusted transaction provided to, but not received by, the network. In addition, for each undelivered trusted transaction, a data package can be sent to the application devices by the unit interface process that indicates the status of the undelivered trusted transaction. Similarly, an audit record is created for an undelivered data package, which is a data package provided to, but not received by, an application device.

Yet another feature of the invention includes a queue process for detecting late data packages and late trusted transactions and creating audit records thereof. The invention further provides a timed out process for creating audit records indicating the timed-out status of a trusted transaction queued by a queue process.

BRIEF DESCRIPTION OF THE DRAWINGS

The present invention, as well as further objects and features thereof, are more clearly and fully set forth in the following description of the preferred embodiment, which should be read with reference to the accompanying drawings, wherein.

DETAILED DESCRIPTION OF THE PREFERRED EMBODIMENT

Figure 1:
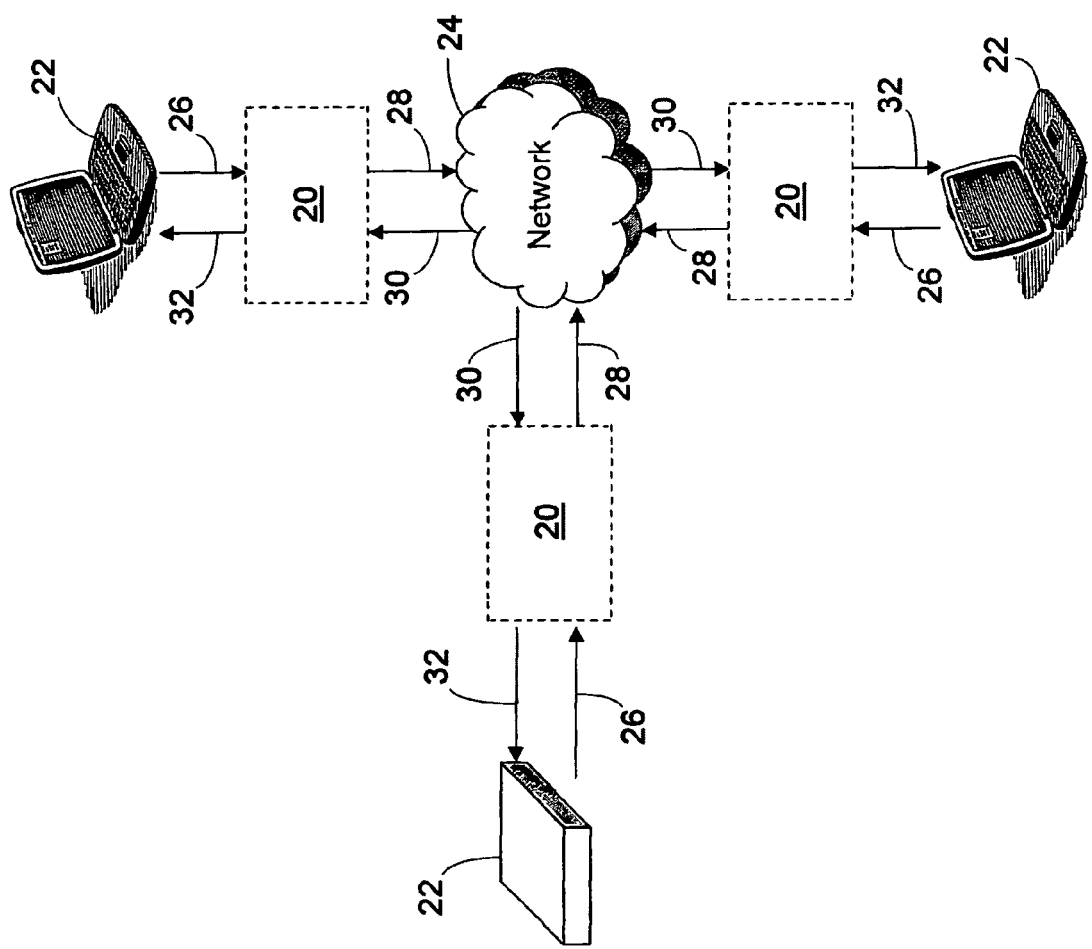
FIG. 1 shows multiple management systems as described by the present invention interposed between application devices and a network through which trusted transactions are communicated.

FIG. 1 depicts the placement of a preferred embodiment of a management system 20 for securely managing application transactions using cryptographic techniques. The management system 20 is logically interposed between an application device 22 and a network 24 to receive an inbound data package 26 from the application device 22 and deliver a trusted transaction 28 built around the received data package 26 for delivery to the network 24. Similarly, the management system 20 receives inbound trusted transactions 30 from the network 24, which originated from another management system 20, and removes an outbound data package 32 according to the method of the present invention for delivery to the application device 22.

As shown in FIG. 1, a management system 20 is interposed between each application device 22 and the network 24, which may be any combination of elements for receiving information and routing that information through switches, routers, and the like to another application device 22, including a local area network (LAN), the Internet, a wireless network, or any combination of subnetworks. Although only three application devices 22 and managements systems 20 are shown by FIG. 1, the number of application devices 22 and management systems 20 interconnected through the network is not limited.

The application device 22 to be managed may be any device for which secure management is desired, including without limitation ATMs, cell phones, credit card point-of-sale terminals, and computers. The management system 20 may exist as software on a computer readable medium or as a firmware engine, and may be physically contained with the application device 22 as a software or firmware engine, or may exist outside of the application device 22.

Each of the system components described herein may comprise both software and the required hardware for implementing the software, or just hardware. For example, the network interface driver 44 and the unit interface driver 34 shown in FIG. 2 necessarily contain hardware for interfacing to a network 24 and an application device 22 respectively (i.e., the physical layer of the OSI seven layer model). The routing of an inbound message to a translator or directly to the interface process could occur solely by hardware, or by a combination of software and hardware. These various combinations are known to persons having ordinary skill in the art, and the present invention should be construed in this light. Similarly, where the description of the elements includes logging to storage, the element includes permanent storage for containing such logging, and this will also be understood from the figures, which denote storage media with standardized representations thereof.

Figure 2:
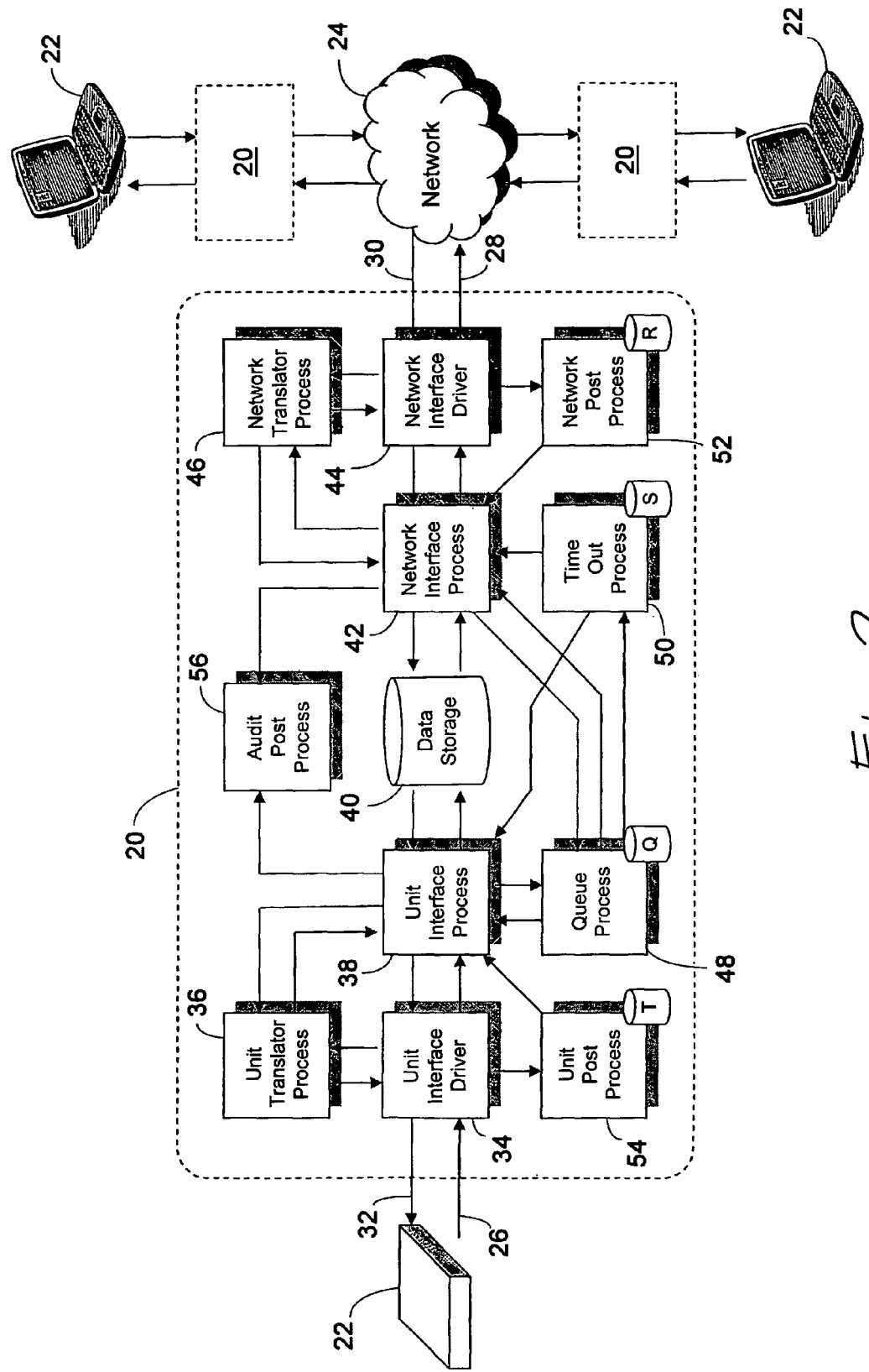
FIG. 2 is a process flow diagram for the preferred embodiment of the present invention.

FIG. 2 is a process flow diagram for each of a transaction network request, a transaction network response, a transaction device request, a transaction unit response, a timed out network request, a timed out device request, an undelivered device request, an undelivered network response, an undelivered network request, and an undelivered device response. The arrows showing the functional connecting may be either a physical layer (i.e., copper wires over which a coded signal representing a data package is sent, like a modem operating over a telephone line) or may be simply the passing of a data structure between different software modules. Each of these is known to those skilled in the art. To this end, the process flow diagram shows the functional connection between the system components, and should not be construed as requiring the physical transmission of information by one component to another (i.e., each of the components may be software modules that pass data structures between themselves), although neither should this be construed so as to preclude such physical transmission.

Application Device Request Message Flow

According to the preferred embodiment, when the application device 22 generates a device request, which is a request from the application device 22 to another application device 22 residing on the network instructing the remote device to perform some action (e.g., return information to the requesting application device 22), a data package 26 containing the device request is provided to a unit interface driver 34.

The unit interface driver 34 provides the data package to either a unit translator process 36 or a unit interface process 38. The data package 26 is provided to the unit translator process 36 if the data package is received in an alien format, meaning that data package is not in a format canonical, or recognized by, the management system 20 (or more specifically the unit interface driver 34). If the data package is received from the application device 22 in a canonical format, the unit translator process 36 may be bypassed by sending the data package 26 directly to the unit interface process 38.

Once provided to the unit interface process 38, a trusted transaction is generated according to the method of the present invention and written to data storage 40. A network interface process 42 retrieves the generated trusted transaction from data storage 40, and either routes the transaction directly to a network interface driver 44 that is responsible for, inter alia, physical delivery of the trusted transaction to a network 24, or first through a network translator process 46 to convert the trusted transaction from the canonical format of the management system 20 to an alien format recognizable by the network 24. In addition, a copy of the transaction is provided to the queue process 48.

Network Request Transaction Flow

When the network 24 provides a network request to the management system 20, which is a device request that has been transferred as a trusted transaction 30 from another application device 22 somewhere else on the network, the inbound trusted transaction is received from the network 24 by the network interface driver 44. The network interface driver 44 provides the trusted transaction to either the network translator process 46 if the trusted transaction is in an alien, or non-canonical, format, or directly to the network interface process 42, which validates the integrity, authenticity and authorization of the network request message according to the method of the present invention and discards any invalid network requests. Once validated, the trusted transaction is provided to data storage 40 for later retrieval by the unit interface process 38.

Once provided to the unit interface process 38 from data storage 40, the network request trusted transaction is converted to a unit request for delivery to the application device 22, and a copy of the unit request provided to a queue process 48 for later use. If necessary, the unit request is routed through the unit translator process 36 for conversion of the unit request into an alien format compatible with the application device 22.

Network Response Message Flow

A previously received network request received from the network 24 may prompt the local application device 22 to send a response back to the requesting entity—a different application device 22 somewhere else on the network 24. The response is received by the management system 20 at the unit interface driver 34 and provided to the unit interface process 38, either directly or after any necessary translation into the management system's 20 canonical format by the unit translator process 36. The unit interface process 38 extracts the previously sent matching unit request from the queue process 48 and a trusted transaction generated in which the data package is both the application device response and the original request. This trusted transaction is then provided to data storage 40. The network interface process 42 retrieves this transaction from data storage 40, and either provides the trusted transaction to the network translator process 46 (after which the transaction is provided to the network interface driver 44) or directly to the network interface driver 44. The network interface driver 44 provides the trusted transaction to the network 24.

Application Device Response Message Flow

Similarly, an application device response can be received through the network 24 by the network interface driver 44, and then provided to the network interface process 42 directly or after being provided to the network translator process 46. After validation of the trusted transaction—mean that the authenticity, integrity, and authorization components are validated—the trusted transaction comprising the response is provided to data storage 40, where it is retrieved by the unit interface process 38 and provided to the unit interface driver 34, either directly or after translation by the unit translator process 36, as previously described.

Timed Out Requests

Although a response to an application device request or a network request (as previously described) may be expected, due to some fault external to the management system 20, the response may not be received by the intended recipient. After the detection of a timed out message, which is determined by the queue process 48, the queue process 48 provides the timed out unit request message to a time out process 50 for logging in permanent storage S. Thereafter the timed out message is provided to the network interface process 42 for distribution to the originator of the timed out request—either the application device 22 or the network 24 (meaning that the network is transporting the request from another application device 22).

Undelivered Requests and Responses

Although a request may be received (as a data package from the application device 22 or as a trusted transaction from the network 24), after migrating through the management system 20, provision of the request to the intended recipient (again, either the application device 22 or the network 24) may fail, for reasons that include hardware failure, connection problems, or problems internal to the recipient. In the event of attempted delivery of a unit request or unit response—that is, a request or response from the application device 22 sent with attempted delivery to the network 24—the network interface driver 44 provides an undelivered or delivered notice to a network post process 52. If the trusted transaction is undelivered, the network post process 52 creates an audit record of the trusted transaction in permanent storage R. The undelivered transaction is provided to the network interface process 42, which updates data storage 40, and returns an error response to the application device 22 through the management system 20 as previously described. If the attempted delivery was of a request, the network interface process 42 returns an error response to the application device 22 through the management system 20 as previously described; no error message is returned if the attempted but failed delivery was of a response.

Similarly, in the event of attempted delivery of a network request or network response—that is, a request or response from the network 24 sent with attempted delivery to the application device 22—the unit interface driver 34 provides an undelivered or delivered notice to a unit post process 54. If the data package is undelivered, the unit post process 54 creates an audit log in permanent storage T. The undelivered transaction is provided to the unit interface process 38, which updates data storage 40. If the attempted delivery was of a request, the unit interface process 42 returns an error response to the network 24 through the management system 20 as previously described; no error message is returned if the attempted but delivery was of a response.

Each trusted transaction migrating through the management system 20 is provided to an audit post process 56, which generates an audit record, itself a trusted transaction with the migrating trusted transaction as the data package thereof. The generated audit record is then added to an audit log of the audit post process 56, which audit log is also a trusted transaction. The audit log is recreated after the addition of the trusted transaction, and recorded to permanent storage of the audit post process 56. In addition, the preferred embodiment of the management system 20 and method provides for responding to requests for specific audit records or the entire audit log from within the storage of the audit post process 56.

According to another embodiment of the invention, the unit translator process 36 and network translator process 46 are omitted. This requires that the network 24 and application device 22 each accept and deliver trusted transactions and data packages, respectively, in a canonical format of the management system 20.

Figure 3:
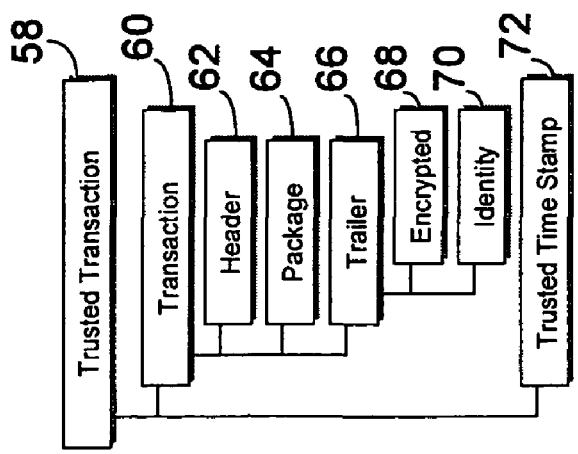
FIG. 3 depicts a trusted transaction object.

As shown in FIG. 3, a trusted transaction 58 comprises a transaction 60 and an Integrity object, which is more specifically a trusted time stamp 72 generated from a time stamp token provided by a Time Stamp Authority. A transaction comprises a header 62, a data package 64—which is the data ultimately delivered/received to/from an application device 22—and a trailer 66. The transaction data package 64 is either unencrypted plaintext or encrypted ciphertext, but not both.

Figure 4:
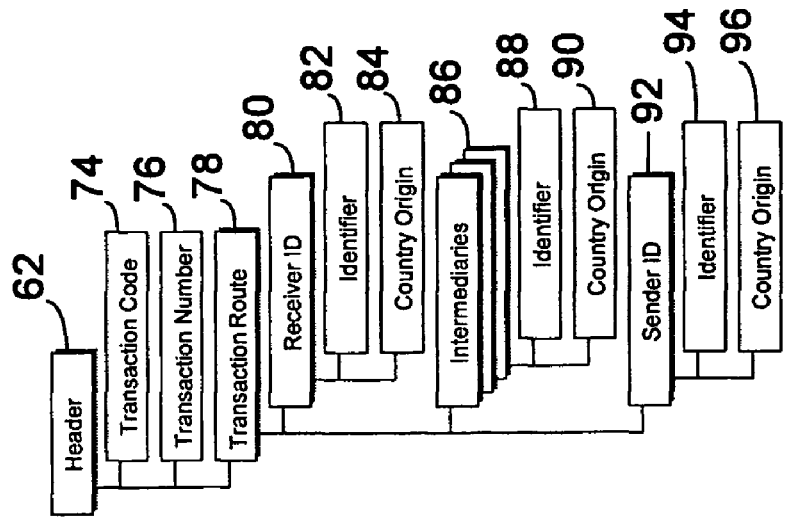
FIG. 4 depicts the header of the trusted transaction object of FIG. 3.

As shown in FIG. 4, according to the preferred embodiment, the transaction header 62 is composed of a transaction code 74, a transaction number 76, and a transaction route 78. The transaction code 74 is a globally-unique object identifier (OID) that is infinitely expandable and infinitely extensible. A common OID arc establishes the first half of the OID that is unique to the invention. Further OID definitions can be added and registered as needed. The transaction number 76 is a relatively unique number used to match request and response messages. The transaction route 78 is a compound data structure that identifies the sender entity with a sender ID object 92, each intermediary entity (i.e., each intermediate sender and receiver entity) with one ore more intermediary objects 86, and the target receiver entity with a receiver ID object 80. Each of these entities is further defined by a two-character international country code as defined in ISO 3166, and a registered OID to uniquely identify the entity.

Referring again to FIG. 3, the transaction trailer 66 optionally includes one or both of an identity object 70 and an encryption object 68. Although each of these is optional, the preferred embodiment of the invention uses both. According to the preferred embodiment, the Identity object 70 is a SignedData object as defined in either the X9.73 or X9.96 Cryptographic Message Syntax (CMS) standards (incorporated by reference herein), with detached data. The digital signature is on the plaintext transaction data package and generated by the sender. The Encryption object 68 is an EnvelopedData object as defined by one of X9.73 or X9.96 CMS, with detached data. The encryption is on the plaintext transaction data package, which produces the ciphertext.

According to the preferred embodiment of the invention, the Integrity object 72 is a Time Stamp Token (TST) as defined in American National Standard X9.95-2005 Trusted Time Stamp (incorporated by reference herein), which contains either a hash of the Transaction object 60 or a digital signature of the Transaction object 60, thus providing content integrity linking to a provable point in time. The integrity object is mandatory and present on all trusted transactions 58.

The selection of the transaction code 74 and the value of the transaction number 76 in the header 62, selection of the security methods for the identity object 70 and encryption object 68 in the trailer 66, and the selection of the method used for the trusted time stamp 72 in the Integrity object 72 are related to the application requirements, and are referred to herein as predetermined management parameters.

The present invention is described above in terms of a preferred illustrative embodiment in which a specifically described transaction management system 20 and method are described. Those skilled in the art will recognize that alternative constructions of such an apparatus, system, and method can be used in carrying out the present invention. Other aspects, features, and advantages of the present invention may be obtained from a study of this disclosure and the drawings, along with the appended claims.

We claim:

1. A method for securely managing application transactions using cryptographic techniques to provide data integrity, entity authentication, and data confidentiality, said method comprising:

if a data package is received from an application device, then:
  a) generating an outbound trusted transaction,
  b) if said outbound trusted transaction is not canonical to a network, translating said outbound trusted transaction into a message format canonical to said network, and
  c) sending said outbound trusted transaction to said network;

if an inbound trusted transaction is received from a network, then:
  a) validating said inbound trusted transaction,
  b) if said data package is not canonical to said application device, translating said data package into a message format canonical to said application device, and
  c) delivering said data package of said inbound trusted transaction to said application device;

administering an audit log for each generated and each validated trusted transaction;

managing each generated and each validated trusted transaction; and wherein each trusted transaction is a data structure comprising:
  a data package, said data package being in plaintext or ciphertext;
  a header for identifying attributes of said data package, said header comprising:
    a transaction code that is a globally-unique, infinitely expandable and infinitely extensible object identifier,
    a transaction number for matching request and response data packages, and
    a transaction route identifying the sender of the data package, the receiver of the data package, and any intermediaries;
  a trailer for confirming the identity of an originator of the data package and providing data confidentiality of said data package; and
  an integrity object for providing content integrity of said data package to a provable point in time.

2. A method for securely managing application transactions, as recited in claim 1, wherein said generating step comprises:

if said data package is not in canonical format, translating said data package to a canonical format;

generating a header according to predetermined management parameters;

generating an identity object of said trailer for said data package according to said predetermined management parameters;

generating an encryption object of said trailer and encrypting said data package according to said predetermined management parameters; and generating a trusted time stamp according to said predetermined management parameters.

3. A method for securely managing application transactions, as recited in claim 1, wherein said validating step comprises:

if said inbound trusted transaction is not in a canonical format, translating said inbound trusted transaction into a canonical format;

validating a trusted time stamp of said inbound trusted transaction according to said predetermined management parameters;

processing an encryption object of said trailer and decrypting a data package of said inbound trusted transaction according to said predetermined management parameters;

validating an identity object of said trailer according to said predetermined management parameters; and processing a header of said inbound trusted transaction according to predetermined management parameters.

4. A method for securely managing application transactions, as recited in claim 1, wherein said administering step comprises:

generating an audit record for each inbound and outbound trusted transaction, according to the method of claim 2, wherein said data package of said audit record is a trusted transaction and wherein said predetermined management parameters are selected from a group of predetermined audit management parameters;

adding said audit record to a data package of said audit log, said audit log being a trusted transaction;

recreating said audit log according to the method specified in claim 2;

recording said audit log to permanent storage;

responding to any trusted transaction that requests a specific audit record of said audit log;

responding to any trusted transaction that requests said audit log; and for each alarm event, generating an audit alarm according to the method of claim 2 and sending said audit alarm to an application device through said network according to said predetermined audit management parameters.

5. A method for securely managing application transactions, as recited in claim 1, wherein said managing step comprises:

for each undelivered trusted transaction, creating an audit record of said undelivered trusted transaction according to the method of claim 1, and sending a message to an application device, said message indicating the undelivered status of said trusted transaction;

for each undelivered data package, creating an audit record of said undelivered data package according to the method of claim 4;

for each timed-out transaction:
creating an audit record of said timed-out transaction according to the method of claim 4;
if said timed-out transaction was delivered to said network, sending a data package to an application device, said data package indicating the timed-out status of said trusted transaction;
if said timed-out transaction was delivered to said application device, sending a trusted transaction to said network, said trusted transaction indicating the timed-out status thereof;
detecting a late trusted transaction and creating an audit record of said late trusted transaction according to the method of claim 4; and
detecting a late data package and creating an audit record of said late trusted transaction according to the method of claim 4.

6. The data structure of claim 1 wherein said integrity object comprises a Time Stamp Token as defined in American National Standard X9.95-2005 Trusted Time Stamp.

7. The data structure of claim 1 wherein said trailer further comprises:
a SignedData object as defined by one of X9.73 or X9.96 CMS standards with detached data; and
an EnvelopedData object as defined by one of X9.73 or X9.96 CMS with detached data.

8. A system for securely managing application transactions using cryptographic techniques to provide data integrity, entity authentication, and data confidentiality, said system comprising:

a data storage for storing trusted transactions;

a unit interface driver for receiving a data package from and providing a data package to an application device;

a unit interface process being connected to said unit interface driver for receiving data packages therefrom generating outbound trusted transaction based thereon, and for placing trusted transactions into and retrieving data packages from said data storage;

a network interface driver for receiving a trusted transaction from and sending a trusted transaction to a network, said network interface driver being connected to said data storage for the provision of trusted transactions thereto and retrieval of trusted transactions therefrom;

a network interface process connected to said network interface driver for validating an inbound trusted transaction, and placing data packages into and retrieving trusted transactions from said data storage;

an audit logging process connected to said unit interface process and said network interface process for administering an audit log of each generated and validated trusted transaction, managing means for managing each generated trusted transaction and each validated trusted transaction, and processing errors, said managing means being connected to said unit interface driver, said network interface driver, said unit interface process, and said network interface process:

wherein each trusted transaction is a data structure comprising:
a data package, said data package being in plaintext or ciphertext;
a header for identifying attributes of said data package, said header comprising:
a transaction code that is a globally-unique, infinitely expandable and infinitely extensible object identifier,
a transaction number for matching request and response data packages, and
a transaction route identifying the sender of the data package, the receiver of the data package, and any intermediaries;
a trailer for confirming the identity of an originator of the data package and providing data confidentiality of said data package; and
an integrity object for providing content integrity of said data package to a provable point in time.

9. The system of claim 8 further comprising:
a unit translator process connected to said unit interface process and said unit interface driver for translating canonically-formatted data packages to an alien format prior to delivery of said data packages to an application device, and for translating received data packages into a canonical format and providing said translated data packages to said unit interface process; and
a network translator process connected to said network interface process and said network interface driver for translating canonically-formatted trusted transactions to an alien format prior to delivery of said trusted transactions to a network and for translating received trusted transactions into a canonical format from an alien format and providing said translated received trusted transactions to said network interface process.

10. The system of claim 8 wherein said managing means further comprises:
a network post process connected to said network interface driver and said network interface process for creating an audit record of undelivered trusted transactions and sending a message to a unit interface process indicating an undelivered status; and
a unit post process connected to said unit interface driver and said unit interface process for creating an audit record of undelivered data packages;
a queue process connected to said unit interface process and said network interface process for detecting late data packages and late trusted transactions and creating audit records thereof; and
a timed out process connected to said unit interface process and said network interface process for sending a trusted transaction to one of an application device and a network that indicates the timed-out status of the transaction, said timed out process being connected to said queue process for creating an audit record of timed-out transactions.

11. The system of claim 10 further comprising:
a unit translator process connected to said unit interface process and said unit interface driver for translating canonically-formatted data packages to an alien format prior to delivery of said data packages to an application device, and for translating received data packages into a canonical format and providing said translated data packages to said unit interface process; and
a network translator process connected to said network interface process and said network interface driver for translating canonically-formatted trusted transactions to an alien format prior to delivery of said trusted transactions to a network and for translating received trusted transactions into a canonical format from an alien format and providing said translated received trusted transactions to said network interface process.

12. The system of claim 8 wherein said integrity object comprises a Time Stamp Token as defined in American National Standard X9.95-2005 Trusted Time Stamp.

13. The system of claim 8 wherein said trailer further comprises:
a SignedData object as defined by one of X9.73 or X9.96 CMS standards with detached data; and
an EnvelopedData object as defined by one of X9.73 or X9.96 CMS with detached data.

* * * * *